(12) United States Patent
Samuel et al.

(10) Patent No.: US 7,733,831 B2
(45) Date of Patent: Jun. 8, 2010

(54) DETECTING A WIRELESS NETWORK AIR INTERFACE

(75) Inventors: Louis G. Samuel, Swindon (GB); Francis J. Mullany, Swindon (GB); Frederic Battaglia, Middletown, NJ (US); Theodore Sizer, Little Silver, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 927 days.

(21) Appl. No.: 10/923,978

(22) Filed: Aug. 23, 2004

(65) Prior Publication Data

US 2006/0039329 A1 Feb. 23, 2006

(51) Int. Cl.
*H04J 3/06* (2006.01)

(52) U.S. Cl. .............. 370/335; 370/338; 455/67.11; 455/434; 455/552.1

(58) Field of Classification Search .......... 455/436, 455/552.1, 434, 445, 41.2, 411, 442, 448, 455/553.1, 67.11, 443; 370/335, 331, 329, 370/338, 328, 334, 437
See application file for complete search history.

(56) References Cited

U.S. PATENT DOCUMENTS

| | | | | |
|---|---|---|---|---|
| 5,655,003 | A * | 8/1997 | Erving et al. ............... 379/418 |
| 6,400,961 | B1 * | 6/2002 | Lillie et al. .............. 455/552.1 |
| 6,549,779 | B1 * | 4/2003 | Muller et al. ............... 455/439 |
| 6,804,214 | B1 * | 10/2004 | Lundh et al. ............... 370/335 |
| 6,925,074 | B1 * | 8/2005 | Vikberg et al. ............. 370/338 |
| 7,061,898 | B2 * | 6/2006 | Hashem et al. ............. 370/342 |
| 7,092,716 | B2 * | 8/2006 | Nizri et al. ................. 455/448 |
| 7,130,625 | B2 * | 10/2006 | Akgun et al. ............ 455/422.1 |
| 7,181,218 | B2 * | 2/2007 | Ovesjo et al. ............... 455/436 |
| 7,330,452 | B2 * | 2/2008 | Shiu et al. .................. 370/335 |
| 7,447,179 | B2 * | 11/2008 | Lu ............................. 370/335 |
| 2003/0091022 | A1 * | 5/2003 | Blanz et al. ................. 370/350 |
| 2003/0218995 | A1 * | 11/2003 | Kim et al. ................... 370/318 |
| 2004/0213186 | A1 * | 10/2004 | Masuda et al. .............. 370/335 |
| 2004/0246922 | A1 * | 12/2004 | Ruan et al. .................. 370/331 |
| 2004/0266435 | A1 * | 12/2004 | de Jong et al. .............. 455/436 |
| 2005/0044130 | A1 * | 2/2005 | Sillasto et al. .............. 709/200 |
| 2005/0159147 | A1 * | 7/2005 | Roberts et al. .............. 455/423 |
| 2005/0208943 | A1 * | 9/2005 | Pecen et al. ................. 455/436 |
| 2008/0247378 | A1 * | 10/2008 | Bichot et al. ................ 370/350 |

OTHER PUBLICATIONS

European Search Report EP 05 25 5123 dated Nov. 16, 2005.

* cited by examiner

*Primary Examiner*—George Eng
*Assistant Examiner*—Brandon J Miller
(74) *Attorney, Agent, or Firm*—Williams, Morgan & Amerson, PC (57) ABSTRACT

The present invention provides methods for detecting a wireless air interface. The method includes receiving information indicative of at least one wireless access type, determining whether the information indicative of the at least one wireless access type is within an expected range, performing at least one first measurement associated with a first air interface in response to determining that the information indicative of the at least one wireless access type is within the expected range, and performing at least one second measurement associated with a second air interface in response to determining that the information indicative of the at least one wireless access type is not within the expected range.

22 Claims, 5 Drawing Sheets

DETECTING A WIRELESS NETWORK AIR INTERFACE

BACKGROUND OF THE INVENTION

1. Field of the Invention

This invention relates generally to telecommunication systems, and, more particularly, to wireless telecommunication systems.

2. Description of the Related Art

The list of mobile units that may access wireless communication systems, such as a cellular telephone system and/or a Bluetooth-enabled wireless local area network (WLAN), to transmit voice and data signals has expanded dramatically in recent years to include, among other things, cell phones, personal data assistants, global positioning system receivers, laptop computers, and desktop computers. The types of mobile units on the list, as well as the services they are likely to provide, is expected to continue to grow and the proliferation of wireless communication systems has led users to expect uninterrupted access to these systems and/or networks at virtually any time and in virtually any place.

In part to address this demand for universal access, many mobile units are able to communicate with a variety of different systems and/or networks. For example, a mobile unit may be able to establish a first wireless communication link with a base station in a cellular telephone system that operates according to the Universal Mobile Telephony System (UMTS) protocol while a user is outdoors. The same mobile unit may also be able to establish a second wireless communication link with an access point of a wireless local area network that operates according to the Bluetooth protocol when the user is in a "hot spot" associated with the access point. For another example, a mobile unit may be able to establish a first wireless communication link with a base station in a first cellular telephone system that operates according to the UMTS protocol while a user is in a first cell associated with the first base station. When in a second cell, the same mobile unit may also be able to establish a second wireless communication link with a second base station that operates according to a Global System for Mobile telecommunications (GSM) protocol.

Mobile units typically roam from one system to another, necessitating a handover of the mobile unit. Roaming may include moving from one geographic region to another, from one service provider to another, from one type of wireless communication system to another, from one frequency to another within the same system, and the like. A mobile unit may roam for many reasons. For example, a mobile unit may roam from a first base station to a second base station when a user carries the mobile unit from a first cell associated with the first base station into a second cell associated with the second base station. For another example, a mobile unit may roam from a first frequency to a second frequency when fading of the first frequency reduces the quality of the wireless telecommunications on the first frequency relative to the second frequency.

Wireless telecommunication protocols define messages and measurements that may be used to determine whether a handover is desirable and/or necessary. For example, in the UMTS standard, information related to mobile unit mobility is conveyed to the mobile unit via information elements contained within an RRC MEASUREMENT CONTROL message that conforms to the UMTS RRC protocol standard based on ASN.1 encoding, which is an extensible format for message definitions. The information elements in the RRC MEASUREMENT CONTROL message may indicate that the mobile unit should monitor other UMTS frequencies (e.g. the mobile unit should make one or more inter-frequency measurements), inter-Radio Access Technology types (e.g. the mobile unit should make one or more inter-RAT measurements), and/or the health of the frequency currently being used for wireless communication (e.g. the mobile unit should make one or more intra-frequency measurements). The information elements in the RRC MEASUREMENT CONTROL message defined in the UMTS standard may also be used to determine the types of measurement that will be made, as well as when (e.g. via events) and how often (e.g. via cyclic reporting) the measurement reports are sent back to a Serving Radio Network Controller (SRNC).

Mobile units are typically capable of performing a number of measurements on cells in parallel. The types of cell that can be targeted by the measurements are grouped into three categories: active set cells, i.e. cells which are currently used in soft handover, monitored set cells taken from a neighbor list, i.e. cells that are candidates for the active set, and detected set cells, i.e. cells which are of a different frequency or radio access type. The mobile units use information elements in messages such as the RRC MEASUREMENT CONTROL message to define the attributes of the measurement to be made. For example, in the UMTS standard, the mobile unit determines which measurements to perform using a measurement list stored in an Intra-Frequency Cell Information List within an information element of the RRC MEASUREMENT CONTROL message.

The measurements performed by the mobile unit may be categorized based upon the attributes of the measurement. For example, in the UMTS standard, the measurements performed by the mobile unit may be categorized based upon a frequency and a Common Pilot Channel (CPICH) corresponding to the cell associated with the mobile unit. The CPICH is typically used in UMTS to enable channel estimation. The conventional CPICH uses a predefined bit sequence and has a fixed rate of 30 Kbps with a SF (Spreading Factor) of 256. The CPICH value is typically included in an information element in the RRC MEASUREMENT CONTROL message (e.g. the message transmitted on the downlink) and in an information element in the RRC MEASUREMENT REPORT message (e.g. a report message transmitted on the uplink) when identifying a measurement report to a CPICH. Measurement cells can also be identified via their CPICH value. Furthermore, the desired type of report on the CPICH can be identified by the type of event that is indicated in information elements in the RRC MEASUREMENT CONTROL message.

Figure 1:
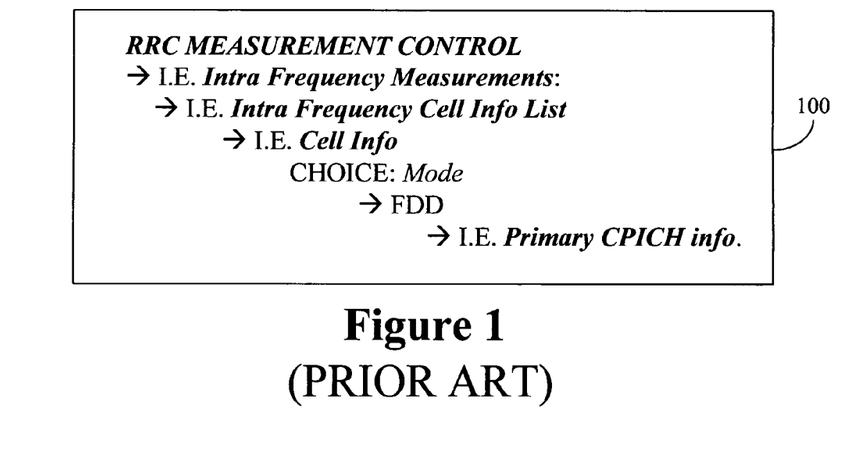
FIG. 1 conceptually illustrates a path through conventional information elements of the RRC MEASUREMENT CONTROL message.

FIG. 1 conceptually illustrates a path 100 through the information elements of the RRC MEASUREMENT CONTROL message that may be used to set the CPICH value. In the illustrated embodiment and in accordance with the ASIN.1 encoding standard, the path 100 begins at an Intra-Frequency Measurements information element, which includes an Intra-Frequency Cell Information List information element. Information regarding one or more cells is included in a Cell Information information element. A mode associated with the cell may then be chosen. For example, a Frequency Division Duplex (FDD) mode may be chosen, which leads to the Primary CPICH Information information element. Table 1 illustrates a conventional Primary CPICH Information information element.

TABLE 1

Primary CPICH (FDD) information element

| Information Element/Group name | Need | Multi | Type and reference | Semantics description |
|---|---|---|---|---|
| Primary scrambling code | MP | | Integer(0 . . . 511) | |

As shown in Table 1, the CPICH of a cell typically takes on an integer value in the range $0 \leq n \leq 511$, where n indicates the primary scrambling code that is used within the measured cell. The value of MP in the "Need" field indicates that this is a mandatory information element.

The events that trigger a measurement report can also be set within information elements in the RRC MEASUREMENT CONTROL message. The UMTS RRC protocol defines a standard set of trigger events. In the interest of clarity, these known definitions will not be repeated herein, however, the trigger events are typically grouped as follows:

$1_A$ through $1_G$—events in FDD that trigger a intra-frequency measurement report;

$2_A$ through $2_F$—events that trigger an inter-frequency measurement report, and $3_A$ through $3_D$—events that trigger an inter-RAT measurement report.

Figure 3:
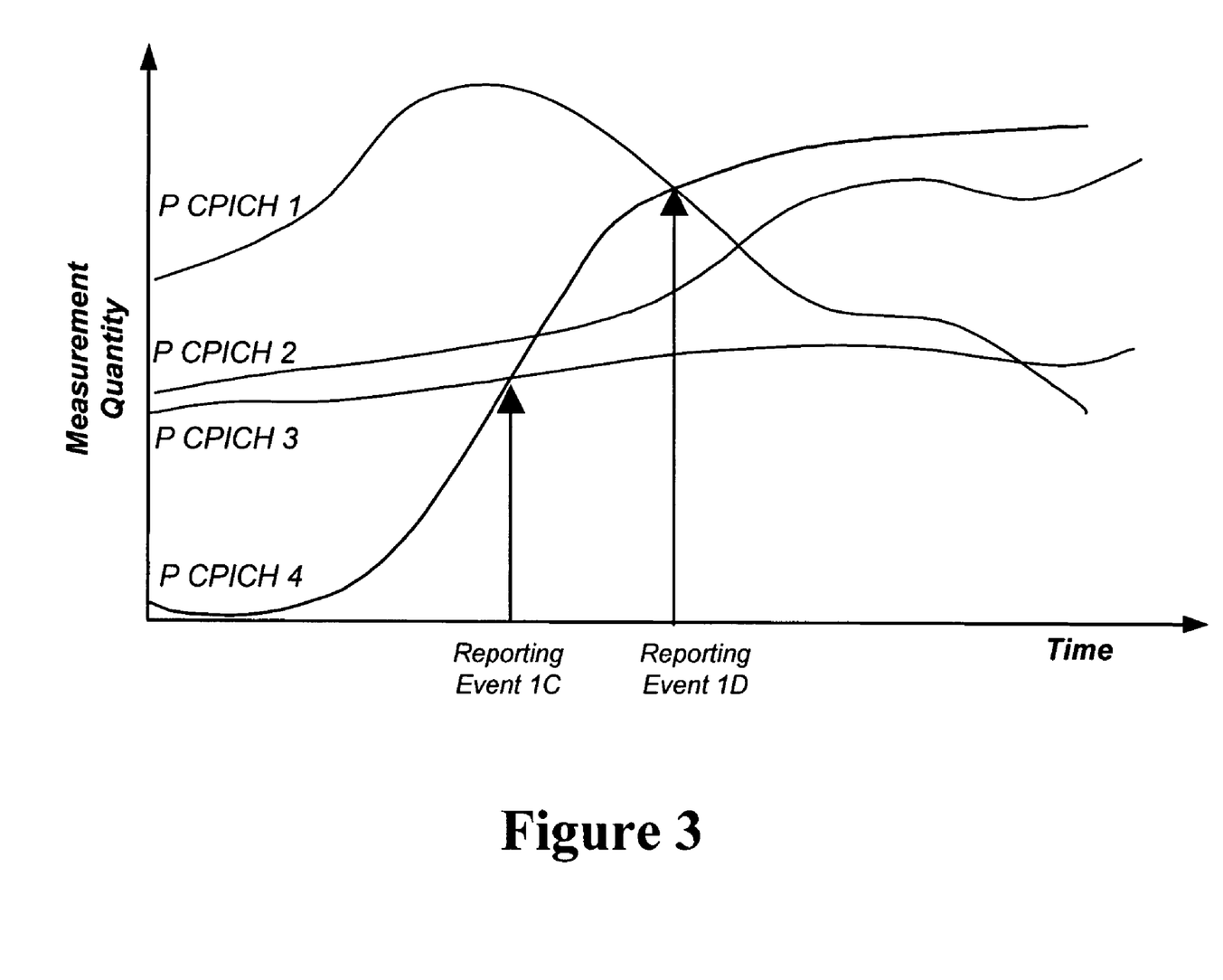
FIG. 3 conceptually illustrates measurements of CPICH measurement qualities.

For example, as shown in FIG. 3, under normal UMTS operation the event trigger $1_C$ corresponds to a measurement quality of a CPICH that is not in the active set (CPICH-4) becoming better than a measurement quality of a CPICH of member of the active set (CPICH-3). For another example, the event trigger $1_D$ refers to a measurement quality of CPICH-4 becoming better than a measurement quality of the best CPICH currently available (CPICH-1). Following a trigger event, one or more measurements are transmitted via the RRC MEASUREMENT REPORT message.

Figure 2:
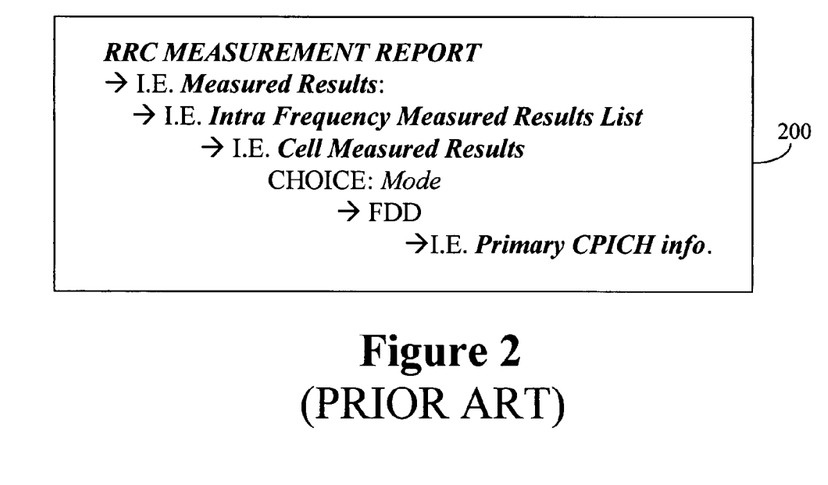
FIG. 2 conceptually illustrates a path through conventional information elements of the RRC MEASUREMENT REPORT message.

FIG. 2 conceptually illustrates a path 200 through the information elements of the RRC MEASUREMENT REPORT message. In the illustrated embodiment and in accordance with the ASIN.1 encoding standard, the path 200 begins at a Measured Results information element, which includes an Intra-Frequency Measured Results information element. Information regarding one or more cells is included in a Cell Measured Results information element. A mode associated with the cell may then be chosen. For example, a Frequency Division Duplex (FDD) mode may be chosen, which leads to the Primary CPICH Information information element.

Information in the RRC MEASUREMENT REPORT message may then be used to decide whether a handover is desirable or necessary. For example, a mobile unit may provide an RRC MEASUREMENT REPORT message to a Radio Network Controller (RNC). A Radio Resource Manager (RRM) in the Radio Network Controller (RNC) may then use this information to decide whether or not to hand over the mobile unit. The handover is usually performed in a hard or "vertical" manner. There is a complete break in the delivery of data during a hard handover. For example, during a vertical handover from a GSM system to a UMTS system, the call is stopped on the GSM system and re-established on the UMTS system after a short time delay. For another example, during a hard handover from a first frequency to a second frequency of a UMTS system, the call stopped on the first frequency and re-established on the second frequency of the UMTS system. In one embodiment, the inter-RAT measurements and the inter-frequency measurements may be used to determine whether a hard handoff is desirable or necessary.

Conventional wireless telecommunications networks are not capable of performing soft vertical handovers, i.e. a handover in which data is provided substantially continuously, between networks having different radio access types. For example, a conventional Radio Network Controller is not capable of negotiating a soft vertical handover from a UMTS network to a Bluetooth network. The inability of the conventional wireless telecommunications networks to perform soft vertical handovers is due, at least in part, to the absence of a mechanism for detecting the presence of air interfaces formed by disparate networks, as well as a mechanism for measuring and comparing the quality of the communication links formed over the disparate air interfaces.

The present invention is directed to addressing the effects of one or more of the problems set forth above.

SUMMARY OF THE INVENTION

In one embodiment of the instant invention, a method is provided for detecting a wireless air interface. The method includes receiving information indicative of at least one wireless access type, determining whether the information indicative of the at least one wireless access type is within an expected range, performing at least one first measurement associated with a first air interface in response to determining that the information indicative of the at least one wireless access type is within the expected range, and performing at least one second measurement associated with a second air interface in response to determining that the information indicative of the at least one wireless access type is not within the expected range.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
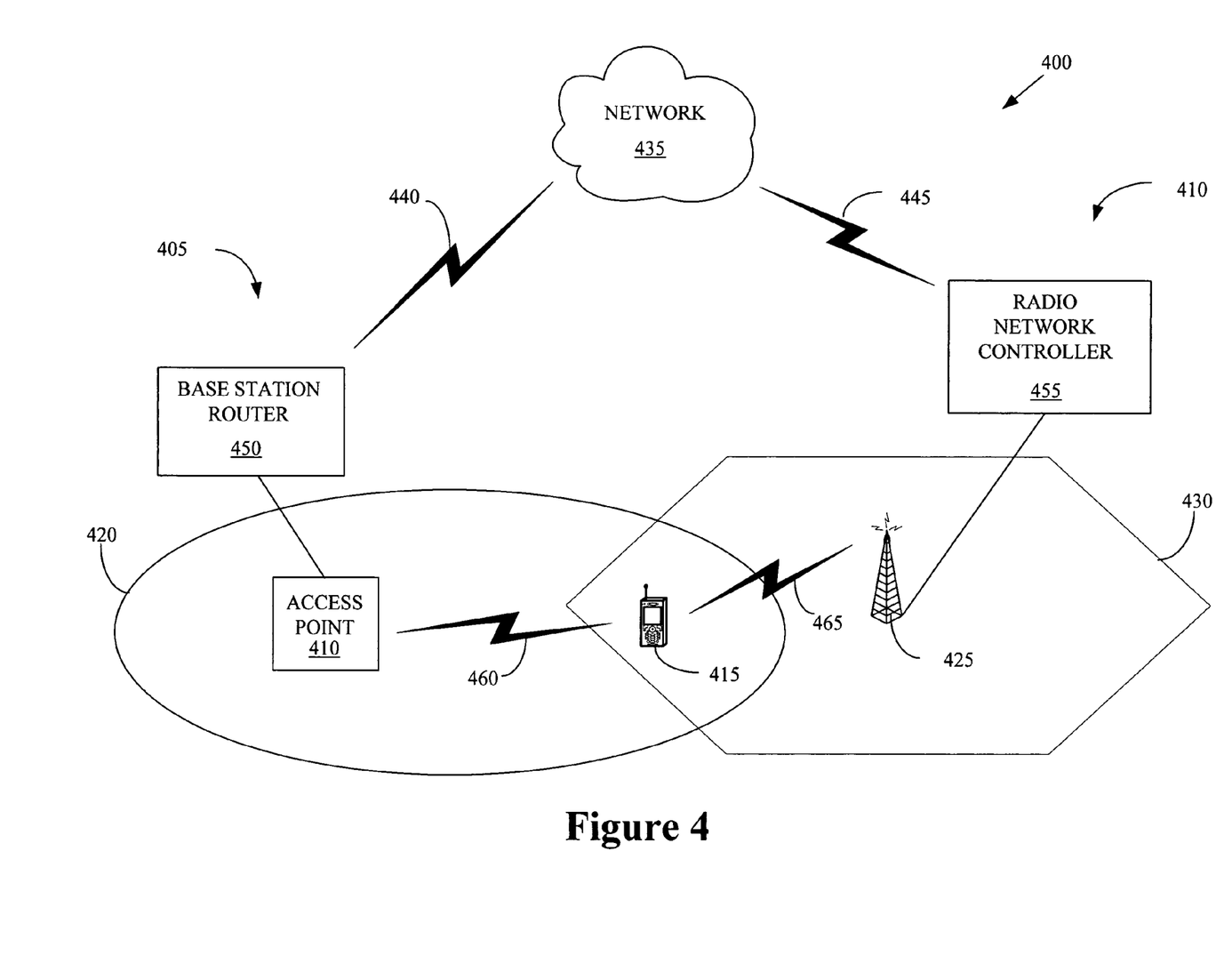
FIG. 4 shows one exemplary embodiment of a system including first and second networks, in accordance with the present invention.

FIG. 4 shows one exemplary embodiment of a system 400 including first and second networks 405, 410. Devices in the first and second networks 405, 410 exchange messages according to first and second protocols, respectively. In the illustrated embodiment, the first network 405 is a Bluetooth network including an access point 410 that may establish concurrent wireless telecommunications links with one or more mobile units 415 in a geographic area, such as a hot spot 420, using the Bluetooth protocol. In the illustrated embodiment, the second network 410 is a cellular telephone network including a base station 425 that may establish concurrent wireless telecommunications links with the mobile units 415 in a geographic area, such as a cell 430, using a Universal Mobile Telephony System (UMTS) protocol.

In the interest of clarity, the present invention will be described assuming that the first network 405 is a Bluetooth-enabled network and the second network 410 is a UMTS network. However, persons of ordinary skill in the art should appreciate that the present invention may be practiced with a variety of first and second networks 405, 410 that permit messages to be exchanged among devices in the networks 405, 410 according to first and second protocols, respectively, wherein the first protocol is different than the second protocol. For example, the first network 405 may operate according to one of the 802.11 protocols and the second network 410 may operate according to a Global System for Mobile Telephony (GSM) protocol, a Personal Communication System (PCS) protocol, a Voice over Internet Protocol (VoIP), and the like.

The networks 405, 410 are communicatively coupled to a network 435 via interfaces 440, 445, respectively. In various alternative embodiments, the interfaces 440, 445 may be wired interfaces, wireless (air) interfaces, or any combination of the two. Accordingly, the networks 405, 410 are also communicatively coupled to each other via the interfaces 440, 445 and the network 435. The interfaces 440, 445 transmit messages according to a common protocol. For example, in the illustrated embodiment, the interfaces 440, 445 transmit messages according to a UMTS protocol. However, persons of ordinary skill in the art should appreciate that the present invention is not limited to interfaces 440, 445 that transmit messages according to a UMTS protocol. In various alternative embodiments, the interfaces 440, 445 may transmit messages according to any desirable protocol. Furthermore, in various alternative embodiment, the network 435 may be any desirable type of network including, but not limited to, a Plain Old Telephone System (POTS), a cellular telephone system, a satellite network, a Public Switched Telephone Network (PSTN), and an Internet (e.g. for Voice over Internet Protocols, VoIP). Moreover, the network 435 may include a variety of elements not shown in FIG. 1. For example, the network 435 may include routers, hubs, switching centers, network controllers, and the like.

The network 405 includes a base station router 450 that is communicatively coupled to the access point 410 by any desirable wired and/or wireless connection. Although the base station router 450 is only connected to a single access point 410 in FIG. 4, persons of ordinary skill in the art should appreciate that the base station router 450 may be coupled to any desirable number of access points 410. The base station router 450 modifies signals received from the access point 410 and/or the network 435 so that messages may be transmitted via a wireless telecommunications link between the mobile unit 415 and the network 435 according to the first and second protocols. For example, the base station router 450 may modify messages so that they may be transmitted across an air interface 460 between the access point 410 and the mobile unit 415 in the hot spot 420 according to the Bluetooth protocol and across the interface 440 according to the UMTS protocol.

Figure 5:
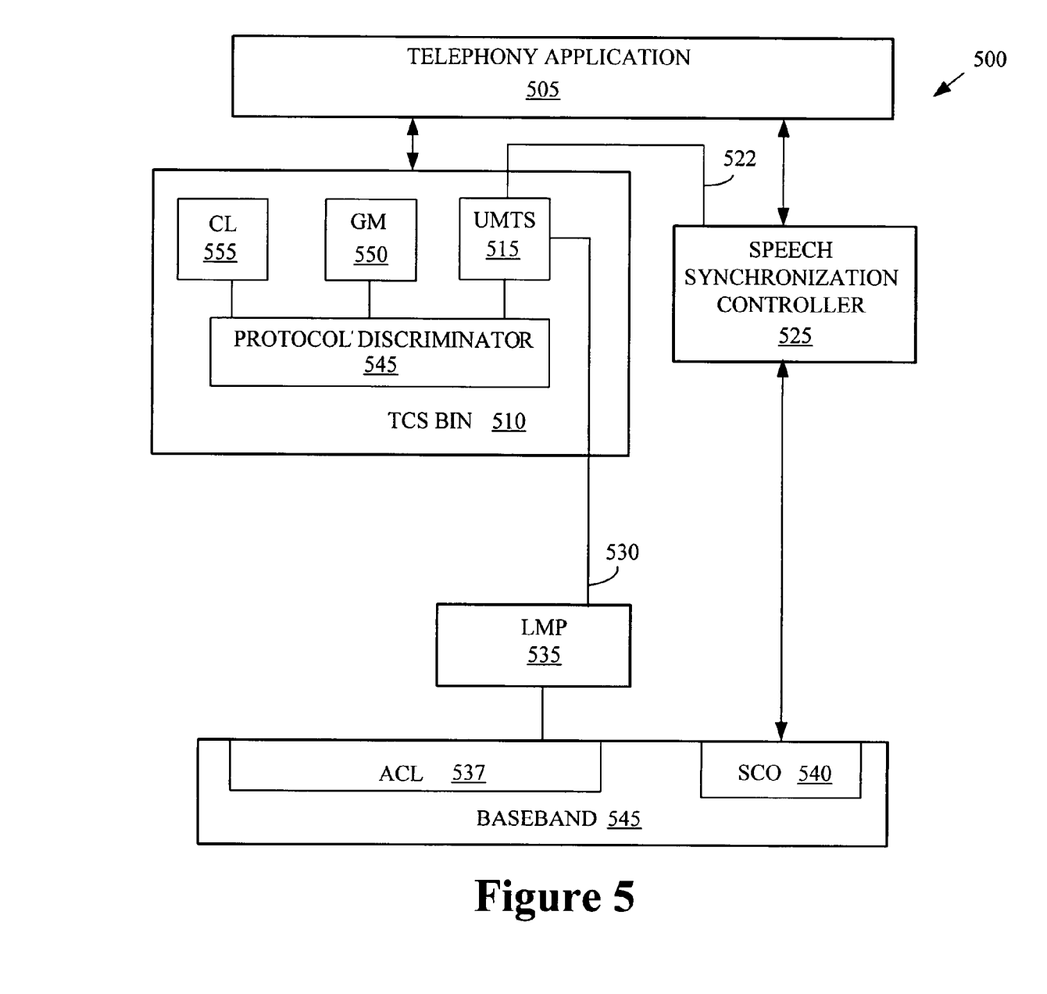
FIG. 5 conceptually illustrates one embodiment of a cordless telephony profile stack that may be used in the system illustrated in FIG. 4, in accordance with the present invention.

FIG. 5 conceptually illustrates one embodiment of a cordless telephony stack 500. The cordless telephony stack 500 may be implemented in the mobile unit 415 shown in FIG. 4 to form one or more wireless telecommunication links according to a Bluetooth protocol and/or a cellular telephony protocol such as UMTS. Persons of ordinary skill in the art should appreciate that only those elements of the cordless telephony profile stack 500 that are relevant to the present invention are illustrated herein. In operation, voice packets are received by a telephony application 505, which provides the voice packets and other control signals to a Telephony Control protocol Specification Binary (TCS Bin) block 510. The TCS Bin block 515 includes a cellular control stack block 515. In the illustrated embodiment, the cellular control stack block 515 is a Universal Mobile Telephone System (UMTS) block 515. However, persons of ordinary skill in the art should appreciate that any desirable cellular telephony control stack may be used to implement the cellular control stack block 515.

The UMTS block 515 manages a voice channel via an interface 522 with a speech synchronization controller 525 and an interface 530 with a link manager protocol (LMP) block 535. For example, the UMTS block 515 may connect and/or disconnect internal speech paths by providing signals to the speech synchronization controller 525 via the interface 525 and may establish and/or release voice synchronization control links by providing signals to the link manager protocol (LMP) block 535 via the interface 530. In one embodiment, the UMTS block 515 also provides arbitrating Radio Resource Management and mobility management (MM) layers within the mobile units. The various air interfaces provide Boolean-like reporting back to the UMTS block 515 to confirm the presence of an adequate alternative air interface. The RRM layer proxies the quality measurement of the alternative air interfaces to their own chip set physical layers (not shown).

The link manager protocol (LMP) block 535 is coupled to an asynchronous control block 537. The interfaces 525, 530 enable the speech synchronization controller 525 to directly control the voice path from the telephony application 505 to a synchronous controller 540 in a baseband 545. In one embodiment, a protocol discriminator 545 uses a three-bit protocol discriminator field (PD), which is typically attached or appended to each voice packet, to determine how the voice packets provided to the TCS Bin 510 are handled. The Bluetooth standard has explicitly defined three values for the protocol discriminator field (PD). For example, a value of 0x1 in the protocol discriminator field indicates that a group management (GM) block 550 should handle the message. For another example, a value of 0x2 in the protocol discriminator field indicates that a connection-less (CL) block 555 should handle the message. All other values of the protocol discriminator are reserved in the Bluetooth standard.

Referring back to FIG. 4, the network 410 includes a radio network controller 455 that is communicatively coupled to the base station 425 by any desirable wired and/or wireless connection. Although the radio network controller 455 is only connected to a single base station 425 in FIG. 4, persons of ordinary skill in the art should appreciate that the radio network controller 455 may be coupled to any desirable number of base stations 425 that may establish and/or maintain any desirable number of concurrent wireless telecommunication links with any desirable number of mobile units 415. Persons of ordinary skill in the art should also appreciate that, in the interest of clarity, only those aspects of the operation of the radio network controller 455 that are relevant to the present invention will be described herein.

The radio network controller 455 provides information indicative of a wireless access type to the mobile unit 415 via, e.g. the base station 425 and/or the access point 410. For example, the information may be provided as part of an authentication procedure. In one embodiment, the information indicative of the wireless radio access type is included in an information element of an RRC MEASUREMENT CONTROL message, such as the information element depicted in Table 2.

TABLE 2

Primary CPICH (FDD) information element

| Information Element/ Group name | Need | Multi | Type and reference | Semantics description |
|---|---|---|---|---|
| Primary scrambling code | MP | | Integer (0 . . . 511) | UMTS Range (0x0-0x1FF) |
| Primary scrambling code | MP | | Integer (512 . . . 1023) | New System (0x200-0x3FF) |
| Primary scrambling code | MP | | Integer (1024 . . . 1535) | Bluetooth (0x400-0x5FF) |
| Primary scrambling code | MP | | Integer (1536 . . . 2047) | 802.11 (0x600-0x7FF) |

In the ASIN.1 standard, the expected range of the primary CPICH control element is an integer between 0 and 511. Integers in the expected range indicate a scrambling code of a UMTS channel, as discussed above. However, the ASIN.1 standard is an extensible format for message definitions that allows for extensions to information elements. Accordingly, in one embodiment, the primary CPICH control element may also include values that are outside of the expected range. The values that are not in the expected range are indicative of additional wireless access types. For example, integer values of the information element between 1024 and 1535 may be indicative of a Bluetooth wireless access type. For another example, integer values of the information element between 1536 and 2047 may be indicative of an 802.11 wireless access type. In the illustrated embodiment, integer values of the information element between 512 and 1023 are reserved for a new system. However, persons of ordinary skill in the art should appreciate that, in alternative embodiments, the ranges of integer values associated with each wireless access type may be varied as desired. Moreover, additional ranges indicative of other wireless access types and/or fault conditions may be included.

Figure 6:
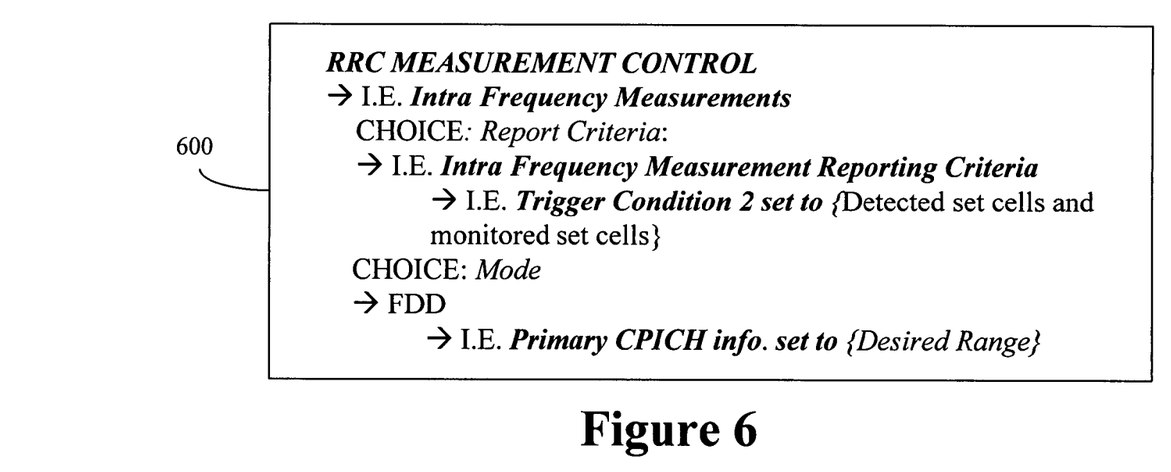
FIG. 6 shows one exemplary embodiment of a path that may be used to configure triggering events in the information element Intra-Frequency Measurements of the RRC MEASUREMENT CONTROL message, in accordance with the present invention.

The radio network controller 455 may also provide information indicative of one or more triggering events. For example, the radio network controller 455 may provide information indicative of triggering events such as the detection of other air interface types for the purposes of soft handover. In one embodiment, the triggering events may be Boolean events such as the event $1_C$, in which a quality of service parameter of an inactive CPICH becomes better than a quality of service parameter of an active primary CPICH, and/or the event $1_D$, which indicates that it is desirable to change the best cell. In one embodiment, the information indicative of the triggering event(s) is included in an information element of the RRC MEASUREMENT CONTROL message. FIG. 6 shows one exemplary embodiment of a path 600 that may be used to configure triggering events in the information element Intra-Frequency Measurements of the RRC MEASUREMENT CONTROL message.

Figure 7:
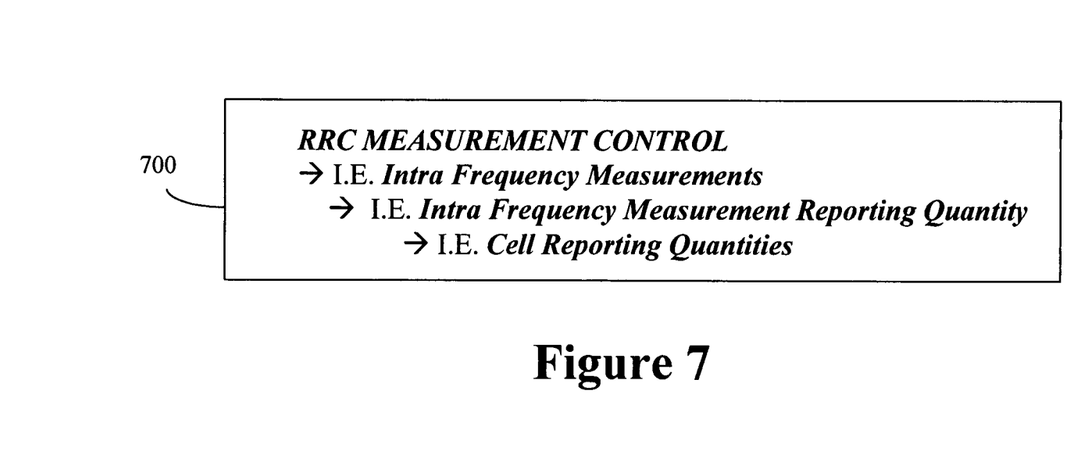
FIG. 7 shows one exemplary embodiment of a path that may be used to configure Cell Reporting Quantities information element of the RRC MEASUREMENT CONTROL message.

The radio network controller 455 may further provide information indicative of information that may be included in a measurement report. In one embodiment, the information indicative of the information that may be included in the measurement report is provided in an information element Cell Reporting Quantities of the RRC MEASUREMENT CONTROL message. Table 3 shows one exemplary embodiment of the Cell Reporting Quantities information element. In the illustrated embodiment, a "Choice Air Interface Detect" group is part of a mandatory path. The Choice Air Interface Detect group includes information elements indicating that it is desirable to attempt to detect air interfaces corresponding to Bluetooth data, Bluetooth TCS Bin, 802.11(a), and 802.11(b) protocols. These information elements are Boolean values. For example, an entry of TRUE means that the radio network controller 455 is requesting that the corresponding information element be included in the measurement report. FIG. 7 shows one exemplary embodiment of a path 700 that may be used to configure Cell Reporting Quantities information element of the RRC MEASUREMENT CONTROL message.

TABLE 3

Information element for Cell Reporting Quantities with additional definition of soft handoff trigger report for Bluetooth and other interfaces. For all Boolean types TRUE means inclusion in the report is requested.

| Information Element/Group name | Need | Multi | Type and reference | Semantics description |
|---|---|---|---|---|
| SFN-SFN observed time difference reporting indicator | MP | | Enumerated (No report, type 1, type 2) | |
| Cell synchronisation information reporting indicator | MP | | Boolean | |
| Cell Identity reporting indicator | MP | | Boolean | |
| CHOICE mode >FDD | MP | | | |
| >>CPICH Ec/N0 reporting indicator | MP | | Boolean | |
| >>CPICH RSCP reporting indicator | MP | | Boolean | |
| >>Pathloss reporting indicator | MP | | Boolean | |

TABLE 3-continued

Information element for Cell Reporting Quantities with additional
definition of soft handoff trigger report for Bluetooth and other
interfaces. For all Boolean types TRUE means inclusion in the
report is requested.

| Information Element/Group name | Need | Multi | Type and reference | Semantics description |
|---|---|---|---|---|
| >TDD | | | | |
| >>Timeslot ISCP reporting indicator | MP | | Boolean | |
| >>Proposed TGSN Reporting required | MP | | Boolean | |
| >>Primary CCPCH RSCP reporting indicator | MP | | Boolean | |
| >>Pathloss reporting indicator | MP | | Boolean | |
| CHOICE Air Interface detect | MP | | | New choice added |
| >Bluetooth TCS Bin | | | | |
| >> TCS Bin | MP | | Boolean | |
| >> Bluetooth data | MP | | Boolean | |
| >802.11 | | | | |
| >>802.11a | MP | | Boolean | |
| >>802.11b | MP | | Boolean | |
| >TBD | | | | |
| >>TBD | MP | | Boolean | New Air interface |

The mobile unit 415 receives the information provided by the radio network controller 455, e.g. the information in the RRC MEASUREMENT CONTROL message, and then uses this information to determine whether to make one or more measurements. In one embodiment, the mobile unit 415 uses the provided information to detect the presence of one or more air interfaces. For example, as shown in FIG. 4, the mobile unit 415 may be in a region where the hot spot 420 overlaps with the cell 430. Based upon the provided information, the mobile unit 415 performs measurements to detect air interfaces 460, 465. For example, the mobile unit 415 may detect a UMTS air interface after determining that a primary CPICH control element is within an expected range, e.g. integers between 0 and 511. For another example, the mobile unit 415 may detect a Bluetooth air interface and/or an 802.11 air interface after determining that the primary CPICH control element is not within an expected range, e.g. integers outside of the range 0 and 511.

In one embodiment, the mobile unit 415 uses the provided information to measure the quality of service (QoS) of one or more of the air interfaces 460, 465. The quality of service measurement may include measurements of a strength-of-presence (a dB strength), a signal-to-noise ratio, a bit error ratio, a maximum throughput rate, a mean throughput rate, reliability, priority and the like. For example, the mobile unit 415 may measure a QoS associated with a UMTS air interface after determining that a primary CPICH control element is within an expected range, e.g. integers between 0 and 511. For another example, the mobile unit 415 may measure a QoS associated with a Bluetooth air interface and/or an 802.11 air interface after determining that the primary CPICH control element is not within an expected range, e.g. integers outside of the range 0 and 511.

A variety of predetermined events may trigger a measurement report. In one embodiment, when the mobile unit 415 detects a new air interface 460, 465, such as a Bluetooth air interface, an 802.11 air interface, a UMTS air interface, a GSM air interface, and the like, the detection event may trigger a measurement report. Moreover, measurement reports may be triggered by the trigger events defined by the UMTS standard. In the interest of clarity, these known definitions will not be repeated herein. For example, the event trigger $1_C$ corresponds to a QoS of an air interface that is not in the active set becoming better than a QoS of an active air interface. For another example, the event trigger $1_D$ refers to a QoS of an air interface becoming better than a QoS of the best air interface currently available (CPICH-1). In one embodiment, the air interfaces included in the triggering events include any or all of the detected air interfaces. Alternatively, the measurements may be reported cyclically or at other predetermined intervals.

Following a trigger event and/or at a predetermined interval, information indicative of the one or more measurements performed by the mobile unit 415 is transmitted to the radio network controller 455 in a message, such as an RRC MEASUREMENT REPORT message. In embodiments using cyclical reporting, the information indicative of the one or more measurements performed by the mobile unit 415 is transmitted to the radio network controller 455 in a Cell Measured Results information element, such as shown in Table 4. In embodiments using trigger event reporting, the information indicative of the one or more measurements performed by the mobile unit 415 is transmitted to the radio network controller 455 in a Cell Measurement Event Results information element, such as shown in Table 5.

TABLE 4

Information element Cell Measured Results that is used in cyclic reporting.
Information element also shows the inclusion of the new Air Interface
Information Element

| Information Element/Group name | Need | Multi | Type and reference | Semantics description |
|---|---|---|---|---|
| Cell Identity | OP | | Cell Identity | |
| SFN-SFN observed time difference | OP | | SFN-SFN observed time difference | |
| Cell synchronisation information | OP | | Cell synchronisation information | |
| CHOICE mode | MP | | | Required for UMTS operation |

TABLE 4-continued

Information element Cell Measured Results that is used in cyclic reporting.
Information element also shows the inclusion of the new Air Interface
Information Element

| Information Element/Group name | Need | Multi | Type and reference | Semantics description |
|---|---|---|---|---|
| >FDD | | | | |
| >>Primary CPICH info | MP | | Primary CPICH info | |
| >>CPICH Ec/N0 | OP | | Integer(0 ... 50) | |
| >>CPICH RSCP | OP | | Integer(0 ... 91) | |
| >>New Air Interface Info | OP | 1 to <Max Alt.I/f> | New Air Interface Info (Table 6) | Note: Included if included in Cell Reporting Quantities |
| >>Pathloss | OP | | Integer(46 ... 158) | In dB |
| >TDD | | | | Not required |
| >>Cell parameters Id | MP | | Cell parameters Id | |
| >>Primary CCPCH RSCP | OP | | Primary CCPCH RSCP info 10.3.7.54 | |
| >>New Air Interface Info | OP | 1 to <Max Alt.I/f> | New Air Interface Info (Table 6) | Note: Included if included in Cell Reporting Quantities |
| >>Pathloss | OP | | Integer(46 ... 158) | In dB |
| >>Timeslot list | OP | 1 to <max TS> | | |
| >>>Timeslot ISCP | MP | | Timeslot ISCP Info | The UE shall report the Timeslot ISCP in the same order as indicated in the cell info |

TABLE 5

Information element Cell Measurement Event Results that is used in event
reporting. Information element also shows the inclusion of the new
Air Interface Information Element.

| Information Element/Group name | Need | Multi | Type and reference | Semantics description |
|---|---|---|---|---|
| CHOICE mode | MP | | | |
| >FDD | | | | |
| >>Primary CPICH info | MP | 1 to <max_Cell_Meas> | Primary CPICH info | |
| >>New Air Interface Info | OP | 1 to <Max_Alt_I/f> | New Air Interface Info (see Table 6) | Note: Included if included in Cell Reporting Quantities |
| >TDD | | | | Not required |
| >>Primary CCPCH info | MP | 1 to <max_Cell_Meas> | Primary CCPCH info | |
| >>New Air Interface Info | OP | 1 to <Max_Alt_I/f> | New Air Interface Info (see Table 6) | Note: Included if included in Cell Reporting Quantities |

Information indicative of the presence of a new air interface 460, 465 and/or a Quality of Service associated with the newly detected air interface 460, 465 may be transmitted from the mobile unit 415 to the radio network controller 455. For example, the Cell Measured Results information element shown in Table 4 and the Cell Measurement Event Results information element shown in Table 5 include a New Air Interface information element that is used to convey information indicative of newly detected air interfaces. For example, as shown in Table 6, the New Air Interface information element may include information indicative of an access type, primary CPICH information, a cell identity, and the like.

TABLE 6

Definition of the information element, New Air Interface Info. Used in RRC MEASUREMENT REPORT message back to RNC.

| Information Element/Group name | Need | Multi | Type and reference | Semantics description |
|---|---|---|---|---|
| New Air Interface Info | MP | | | |
| >Air interface type | MP | | Enumerated (BT TCS, BT Data, 802.11a, 802.11b, TBD) | Note: The type of the alternative interfaces |
| >Primary CPICH info | MP | | Primary CPICH info | |
| >Cell Identity | OP | | Cell Identity | Used if Cell has PLMN ID |

In one embodiment, the radio network controller 455 uses the information indicative of the one or more measurements performed by the mobile unit 415 to determine whether or not to perform a soft vertical handover of the mobile unit 415. In one example, the mobile unit 415 is initially communicatively coupled to the network 435 via the air interface 465, the base station 425, the radio network controller 455, and the interface 445. However, if the mobile unit 415 provides information indicating that the mobile unit 415 has detected the air interface 460 and that the Quality of Service associated with the air interface 460 is superior to the Quality of Service associated with the air interface 465, then the radio network controller 455 may initiate a soft vertical handover from the air interface 465 to the air interface 460. In one embodiment, the soft vertical handover may be between the Bluetooth network 405 and the UMTS network 410. Alternatively, the radio network controller 455 may initiate a soft vertical handover based upon one or more measured strength-of-presence parameters, such as a dB strength.

By providing a method of detecting the presence of heterogeneous wireless telecommunication systems and measuring various parameters associated with air interfaces formed in the heterogeneous systems, the present invention allows the heterogeneous systems to be controlled and identified as if they were a homogenous system. This simplifies the controlling architecture via the identification of a master system. As wireless systems progress towards 4G systems, where the network-of-network paradigm will likely be the predominant paradigm, then this type of solution provides a method of simplifying the complexity of the systems. For example, the simple partitioning and range extension of the UMTS CPICH identifier described above permits other disparate systems to be linked to a UMTS network, as well as allowing the systems to be controlled homogenously.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method implemented at a mobile station, comprising: receiving a message including an information element having a value that falls within one of a plurality of predetermined ranges, each range being associated with a different wireless access type so that the value of the information element indicates one of the different wireless access types, wherein the value of the information element also indicates a scrambling code to be used by the mobile unit when the value of the information element is within a range indicating a first wireless access type; performing at least one first measurement associated with a first air interface that operates according to the first wireless access type in response to determining that the information element has a value that is within the range that indicates the first wireless access type; and performing at least one second measurement associated with a second air interface that operates according to a second wireless access type in response to determining that the information element has a value that is within a range that indicates the second wireless access type.

2. The method of claim 1, wherein receiving the information element having a value indicative of the wireless access type comprises receiving at least one message including at least one information element indicative of the scrambling code.

3. The method of claim 2, wherein receiving the at least one message comprises receiving at least one Radio Resource Control MEASUREMENT CONTROL message including at least one information element that conforms to an extensible Abstract Syntax Notation (ASIN.1) encoding standard, and wherein the information element includes a value in a range indicative of at least one of a Universal Mobile Telephony System (UMTS) access type, a Global System for Mobile Telephony (GSM) access type, a Bluetooth access type, and an 802.11 access type.

4. The method of claim 1, comprising determining whether the information element has a value that is within a range that indicates a scrambling code for the first access type.

5. The method of claim 4, wherein determining whether the information element has a value that is within the range that indicates a scrambling code for the first access type comprises determining whether the information element has a value that is within the range that indicates a scrambling code for a Common Pilot Channel.

6. The method of claim 4, comprising determining whether the information indicative of the wireless access type is within a range associated with the second access type.

7. The method of claim 6, wherein determining whether the information element has a value that is within a range expected for the second wireless access type comprises determining whether the information element has a value that is within a range expected for at least one of a Bluetooth access type and an 802.11 access type.

8. The method of claim 1, and wherein performing the at least one second measurement comprises detecting the at least one second air interface.

9. The method of claim 8, wherein performing the at least one second measurement comprises determining at least one quality of service associated with the at least one second air interface.

10. The method of claim 1, comprising receiving information indicative of at least one trigger event.

11. The method of claim 10, comprising providing, in response to the at least one trigger event, at least one measurement report based upon at least one of the first and second measurements.

12. The method of claim 11, wherein providing the measurement report comprises providing at least one Radio Resource Control MEASUREMENT REPORT message including at least one information element indicative of at least one of the first and second measurements.

13. A method, comprising: providing a message including an information element having a value that falls within one of a plurality of predetermined ranges, each range being associated with a different wireless access type so that the value of the information element indicates one of the different wireless access types, wherein the value of the information element also indicates a scrambling code to be used by a mobile unit when the value of the information element is within a range indicating a first wireless access type; receiving information indicative of at least one first measurement associated with a first air interface when the information element has a value that is within the range that indicates the first wireless access type and a scrambling code of a channel transmitted over the first air interface that operates according to the first wireless access type; and receiving information indicative of at least one second measurement associated with a second air interface when the information element has a value that is within a range that indicates a second wireless access type.

14. The method of claim 13, wherein providing the information indicative of the wireless access type comprises providing at least one message including at least one information element having the value indicative of the wireless access type.

15. The method of claim 14, wherein providing the at least one message comprises providing at least one Radio Resource Control MEASUREMENT CONTROL message including at least one information element that conforms to an extensible Abstract Syntax Notation (ASIN.1) encoding standard, the at least one information element having a value that is indicative of at least one of a Universal Mobile Telephony System access type, a Global System for Mobile Telephony (GSM) access type, a Bluetooth access type, and an 802.11 access type.

16. The method of claim 13, wherein receiving the information indicative of the at least one first measurement associated with the first air interface when the information element has a value that is within the range that indicates a scrambling code comprises receiving the information indicative of the at least one first measurement associated with the first air interface when the information element has a value that is within a range that indicates a scrambling code for a Common Pilot Channel.

17. The method of claim 13, wherein receiving information indicative of the at least one second measurement associated with the second air interface when the information element has a value that is not within the range that indicates a scrambling code comprises receiving information indicative of at least one second measurement associated with at least one of a Bluetooth air interface and an 802.11 air interface when the information element has a value that is not within a range that indicates a scrambling code for a Common Pilot Channel.

18. The method of claim 13, wherein receiving the information indicative of the at least one first measurement associated with the first air interface comprises receiving information indicative of at least one of a detection of the first air interface and a quality of service of the first air interface.

19. The method of claim 18, wherein receiving the information indicative of the at least one second measurement associated with the second air interface comprises receiving information indicative of at least one of a detection of the second air interface and a quality of service of the second air interface.

20. The method of claim 13, comprising providing information indicative of at least one desired first or second measurement.

21. The method of claim 20, wherein providing the information indicative of at least one desired first or second measurement comprises providing at least one Radio Resource Control MEASUREMENT CONTROL message including at least one information element indicative of the at least one desired first or second measurement.

22. The method of claim 13, comprising performing a soft vertical handover between the first and second air interfaces based upon the information indicative of the first and second measurements.

* * * * *